(12) United States Patent
Kato (10) Patent No.: US 10,569,179 B2
(45) Date of Patent: Feb. 25, 2020

(54) TEMPLATE-BASED QUIZ USING STATISTICS

(71) Applicant: NEC CORPORATION, Tokyo (JP)

(72) Inventor: Daishi Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 15/568,028

(22) PCT Filed: Apr. 22, 2015

(86) PCT No.: PCT/JP2015/062282
§ 371 (c)(1),
(2) Date: Oct. 20, 2017

(87) PCT Pub. No.: WO2016/170628
PCT Pub. Date: Oct. 27, 2016

(65) Prior Publication Data
US 2018/0140956 A1 May 24, 2018

(51) Int. Cl.
*A63F 9/24* (2006.01)
*A63F 13/80* (2014.01)
*A63F 13/33* (2014.01)
*A63F 13/67* (2014.01)
*G06Q 30/02* (2012.01)
(Continued)

(52) U.S. Cl.
CPC ............. *A63F 13/80* (2014.09); *A63F 13/33* (2014.09); *A63F 13/5375* (2014.09); *A63F 13/67* (2014.09); *G06Q 30/02* (2013.01); *G06Q 50/20* (2013.01); *G09B 7/02* (2013.01)

(58) Field of Classification Search
CPC ...... A63F 13/80; A63F 13/33; A63F 13/5375; A63F 13/67; G06Q 30/02; G06Q 50/20; G09B 7/02
See application file for complete search history.

(56) References Cited

U.S. PATENT DOCUMENTS 7,769,757 B2 * 8/2010 Grefenstette ........... G06F 16/30
707/736
9,082,309 B1 * 7/2015 Fuka ........................ G09B 7/00
(Continued)

OTHER PUBLICATIONS

Kazuhiro Nakahara et al., "Development and evaluation of a web-based game for common-Sense knowledge acquisition in Japan", Unisys Technology Review, Feb. 2011, pp. 13-23, vol. 30, No. 4.
(Continued)

*Primary Examiner* — Steve Rowland
(74) *Attorney, Agent, or Firm* — Sughrue Mion, PLLC (57) ABSTRACT

A data collection apparatus (10) includes: a template distribution unit (11) that distributes, to a quiz provider who provides a quiz composed of a plurality of descriptions of a topic, templates that are used in generation of the quiz and that each serve as a basis for a different one of the plurality of descriptions; a quiz distribution unit (12) that obtains the quiz that has been generated by the quiz provider using the templates, and distributes the obtained quiz to a respondent; a data analysis unit (13) that obtains a response from the respondent and applies statistical processing to the obtained response; and a template updating unit (14) that, based on a result of the statistical processing applied by the data analysis unit (13), updates the templates targeted for distribution by the template distribution unit.

12 Claims, 7 Drawing Sheets

TEMPLATES

| | |
|---|---|
| [SIMILARITY] | IT IS A TYPE OF ___.<br>IT IS SIMILAR TO ___. |
| [FEATURE] | IT IS A ___ THING |
| [SUBSTITUTE] | IT CAN REPLACE ___.<br>IT ELIMINATES THE NEED TO ___. |
| [INTENDED USE] | IT IS RECOMMENDED BECAUSE ___. |
| [ADVANTAGE] | IT IS CONVENIENT BECAUSE ___.<br>___ CAN BE CONTINUED WITH IT.<br>ITS MERIT IS ___. |
| [BUYING MOTIVE] | ___ CAN BE ACHIEVED BY USING IT.<br>IT IS OWNED BECAUSE ___. |
| [ASSESSMENT] | IT IS POPULAR AMONG ___. |
| [PURPOSE] | IT CAN SOLVE ___.<br>IT CANNOT SOLVE ___. |
| [FUNCTION] | IT CAN ___, BUT CANNOT ___. |
| [FORM] | ITS SHAPE IS ___.<br>ITS SIZE IS ___. |
| [WEIGHT] | IT WEIGHS ___. |
| [USER] | A PERSON WHO IS SUITED FOR USING IT IS ___. |
| [SCENE OF USE] | A PLACE WHERE IT IS USED IS ___. |

(51) Int. Cl.
  *A63F 13/5375* (2014.01)
  *G06Q 50/20* (2012.01)
  *G09B 7/02* (2006.01)

(56) References Cited

U.S. PATENT DOCUMENTS

| | | | | |
|---|---|---|---|---|
| 2007/0077975 | A1* | 4/2007 | Warda | A63F 13/12 463/9 |
| 2009/0216772 | A1* | 8/2009 | Goldfarb | G06Q 10/10 |
| 2010/0081120 | A1* | 4/2010 | Nanjiani | G09B 7/02 434/322 |
| 2011/0125734 | A1* | 5/2011 | Duboue | G09B 7/00 707/723 |
| 2012/0122588 | A1* | 5/2012 | Berger | A63F 13/80 463/42 |
| 2013/0196305 | A1* | 8/2013 | Adir | G06Q 10/10 434/322 |
| 2017/0072300 | A1* | 3/2017 | Kim | G06Q 30/02 |

OTHER PUBLICATIONS

Luis Von Ahn et al., "Verbosity: A Game for Collecting Common-Sense Facts", Proceedings of the SIGCHI Conference on Human Factors in Computing Systems, 2006, pp. 75-78.

Robert Speer et al., "Using Verbosity: Common Sense Data from Games with a Purpose", Proceedings of the Twenty-Third International Florida Artificial Intelligence Research Society Conference (FLAIRS 2010), 2010, pp. 104-109.

Henry Lieberman et al., "Common Consensus: a web-based game for collecting commonsense goals", Proceedings of the Workshop on Common Sense and Intelligent User Interfaces held in conjunction with the 2007 International Conference on Intelligent User Interfaces (IUI 2007), 2007, 6 pages.

International Search Report for PCT/JP2015/062282, dated Jun. 2, 2015.

* cited by examiner

TEMPLATES

| | |
|---|---|
| [SIMILARITY] | IT IS A TYPE OF ___.<br>IT IS SIMILAR TO ___. |
| [FEATURE] | IT IS A ___ THING |
| [SUBSTITUTE] | IT CAN REPLACE ___.<br>IT ELIMINATES THE NEED TO ___. |
| [INTENDED USE] | IT IS RECOMMENDED BECAUSE ___. |
| [ADVANTAGE] | IT IS CONVENIENT BECAUSE ___.<br>___ CAN BE CONTINUED WITH IT.<br>ITS MERIT IS ___. |
| [BUYING MOTIVE] | ___ CAN BE ACHIEVED BY USING IT.<br>IT IS OWNED BECAUSE ___. |
| [ASSESSMENT] | IT IS POPULAR AMONG ___. |
| [PURPOSE] | IT CAN SOLVE ___.<br>IT CANNOT SOLVE ___. |
| [FUNCTION] | IT CAN ___, BUT CANNOT ___. |
| [FORM] | ITS SHAPE IS ___.<br>ITS SIZE IS ___. |
| [WEIGHT] | IT WEIGHS ___. |
| [USER] | A PERSON WHO IS SUITED FOR USING IT IS ___. |
| [SCENE OF USE] | A PLACE WHERE IT IS USED IS ___. |

TEMPLATE-BASED QUIZ USING STATISTICS

CROSS REFERENCE TO RELATED APPLICATIONS

This application is a National Stage of International Application No. PCT/JP2015/062282 filed Apr. 22, 2015, the contents of all of which are incorporated herein by reference in their entirety.

TECHNICAL FIELD

The present invention relates to a data collection apparatus and a data collection method for collecting data from a network, and a computer-readable recording medium having recorded therein a program for realizing these apparatus and method.

BACKGROUND ART

In recent years, the development of networks has led to the increased use of crowdsourcing. Crowdsourcing is a web service in which, using networks, orders for work can be sent to many unspecified individuals, and contractors can be recruited. Crowdsourcing makes it possible to obtain necessary data and receive necessary services at low cost.

A technique called "Verbosity" is known as one of techniques to realize crowdsourcing (see, for example, Non-Patent Document 1). Verbosity is a computer game for collecting common-sense data. Common sense is collected through play of Verbosity by players.

Specifically, Verbosity is a game in which one of two players who have been paired with each other presents a hint, and the other guesses a specific term that serves as a basis for the hint. In Verbosity, the hint that was presented by the narrator and the answer that the guesser associated with the hint are used as data of common sense.

LIST OF PRIOR ART DOCUMENTS

Non Patent Document

Non-Patent Document 1: Luis von Ahn, Mihir Kedia, and Manuel Blum. "Verbosity: A Game for Collecting Common-Sense Facts." Computer Science Department, Carnegie Mellon University, 2006. Web. 1 Apr. 2015. <https://www.cs.cmu.edu/~biglou/Verbosity.pdf.

DISCLOSURE OF THE INVENTION

Problems to be Solved by the Invention

As Verbosity collects only data of associations that have been freely made by players, the attributes of the collected data are biased. For example, if a player serving as the narrator presents only hints that indicate the reasons why a specific topic is liked, collected data indicates nothing but the reasons why the specific topic is liked. Therefore, there is a possibility that a data collector cannot obtain data with attributes that he/she desires.

An object of the present invention is to solve the foregoing issue by providing a data collection apparatus, a data collection method, and a computer-readable recording medium that can control the attributes of data to be collected when data collection is performed via a game on a network.

Means for Solving the Problems

In order to achieve the foregoing object, a data collection apparatus according to one aspect of the present invention includes: a template distribution unit that distributes, to a quiz provider who provides a quiz composed of a plurality of descriptions of a topic, templates that are used in generation of the quiz and that each serve as a basis for a different one of the plurality of descriptions; a quiz distribution unit that obtains the quiz that has been generated by the quiz provider using the templates, and distributes the obtained quiz to a respondent; a data analysis unit that obtains a response from the respondent and applies statistical processing to the obtained response; and a template updating unit that, based on a result of the statistical processing applied by the data analysis unit, updates the templates targeted for distribution by the template distribution unit.

In order to achieve the foregoing object, a data collection method according to another aspect of the present invention includes:

a step (a) of distributing, to a quiz provider who provides a quiz composed of a plurality of descriptions of a topic, templates that are used in generation of the quiz and that each serve as a basis for a different one of the plurality of descriptions;

a step (b) of obtaining the quiz that has been generated by the quiz provider using the templates, and distributing the obtained quiz to a respondent;

a step (c) of obtaining a response from the respondent and applying statistical processing to the obtained response; and a step (d) of, based on a result of the statistical processing applied in the step (c), updating the templates targeted for distribution in the step (a).

In order to achieve the foregoing object, a computer-readable recording medium according to still another aspect of the present invention has recorded therein a program including an instruction that causes a computer to execute:

a step (a) of distributing, to a quiz provider who provides a quiz composed of a plurality of descriptions of a topic, templates that are used in generation of the quiz and that each serve as a basis for a different one of the plurality of descriptions;

a step (b) of obtaining the quiz that has been generated by the quiz provider using the templates, and distributing the obtained quiz to a respondent;

a step (c) of obtaining a response from the respondent and applying statistical processing to the obtained response; and a step (d) of, based on a result of the statistical processing applied in the step (c), updating the templates targeted for distribution in the step (a).

Advantageous Effects of the Invention

As described above, the present invention can control the attributes of data to be collected when data collection is performed via a game on a network.

MODE FOR CARRYING OUT THE INVENTION

Embodiment

The following describes a data collection apparatus, a data collection method, and a program according to an embodiment of the present invention with reference to FIGS. 1 to 7.

[Apparatus Configuration]

Figure 1:
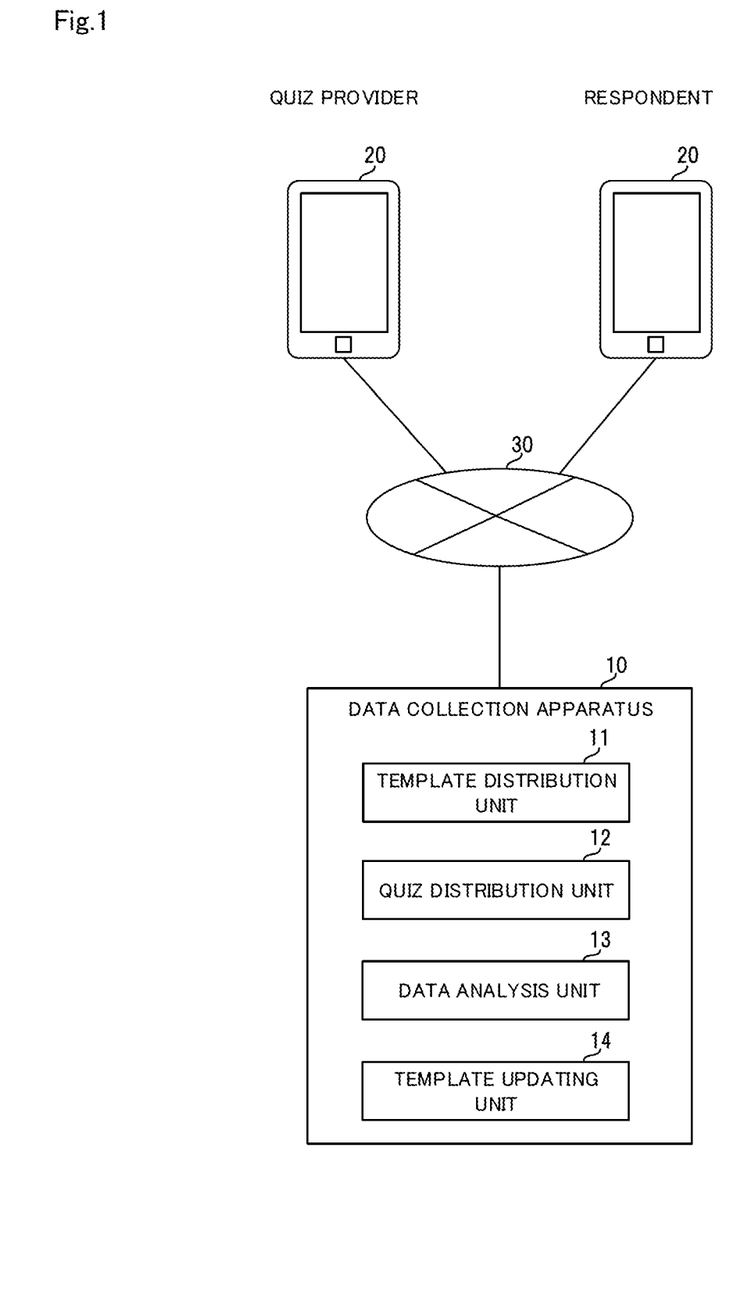
FIG. 1 is a block diagram showing a schematic configuration of a data collection apparatus according to an embodiment of the present invention.

First, a schematic configuration of the data collection apparatus according to the present embodiment will be described using FIG. 1. FIG. 1 is a block diagram showing the schematic configuration of the data collection apparatus according to the embodiment of the present invention.

As shown in FIG. 1, a data collection apparatus 10 according to the present embodiment is connected to terminal devices 20 of players via a network 30. Although only two terminal devices 20 are shown in the example of FIG. 1 for the sake of explanation, the data collection apparatus 10 may be connected to three or more terminal devices 20 in the present embodiment.

As shown in FIG. 1, the data collection apparatus 10 includes a template distribution unit 11, a quiz distribution unit 12, a data analysis unit 13, and a template updating unit 14.

The template distribution unit 11 distributes templates, which are used in generating a quiz composed of a plurality of descriptions of a topic, to a quiz provider. The templates serve as the bases for the plurality of descriptions. One of the players serves as the quiz provider. In the present embodiment, the template distribution unit 11 distributes the templates to the terminal device 20 of the player who serves as the quiz provider. This enables the player serving as the quiz provider to generate a quiz using the templates on his/her terminal device 20.

The quiz distribution unit 12 obtains the quiz that was generated by the player serving as the quiz provider using the templates, and distributes the obtained quiz to the player serving as a respondent. In the present embodiment, the quiz distribution unit 12 obtains the quiz that was generated by the terminal device 20 of the player serving as the quiz provider from the terminal device 20. The quiz distribution unit 12 then distributes the obtained quiz to another player serving as the respondent, specifically, to the terminal device 20 used by another player serving as the respondent.

The data analysis unit 13 obtains a response from the player serving as the respondent, and applies statistical processing to the obtained response. Based on the result of the statistical processing applied by the data analysis unit, the template updating unit 14 updates the templates targeted for distributed by the template distribution unit 11.

As described above, in the present embodiment, a quiz is generated using prepared templates, and the templates are updated based on the result of applying the statistical processing to a response. That is to say, the trend in the provision of quizzes can be adjusted by updating the templates based on the result of the statistical processing. Therefore, the present embodiment can control the attributes of data to be collected when data collection is performed via a game on a network.

Figure 2:
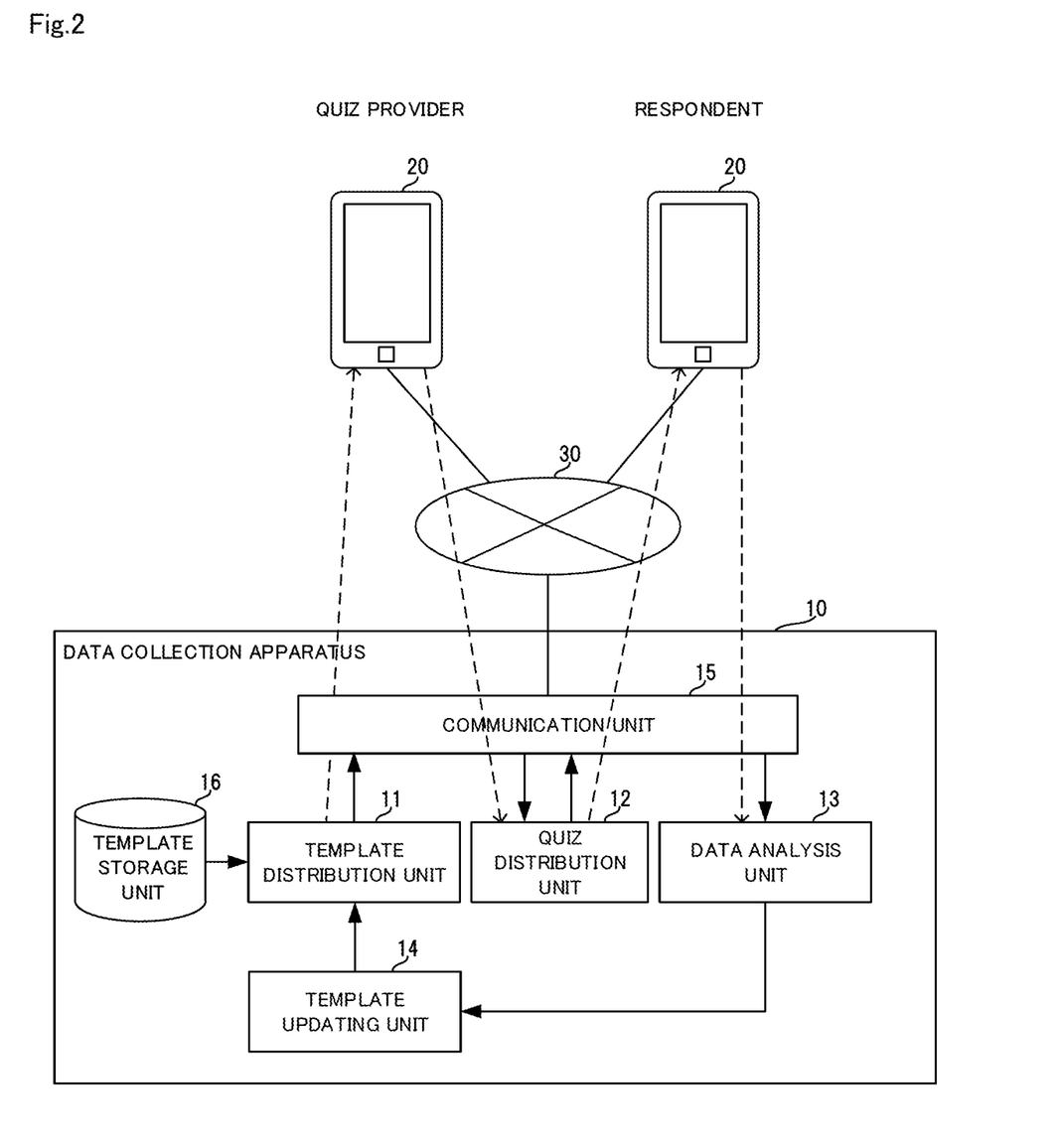
FIG. 2 is a block diagram showing a specific configuration of the data collection apparatus according to the embodiment of the present invention.
Figure 3:
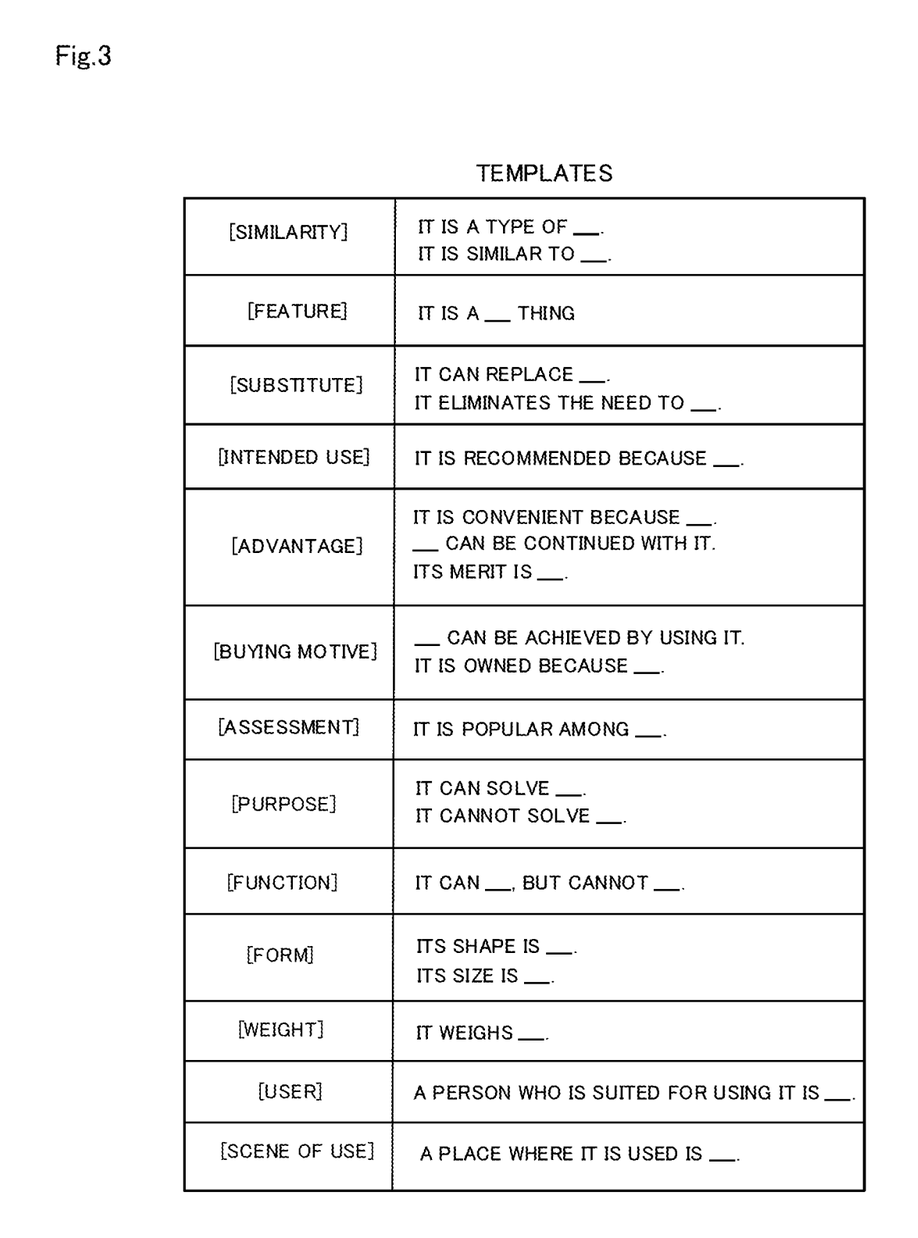
FIG. 3 shows examples of templates used in the embodiment of the present invention.
Figure 4:
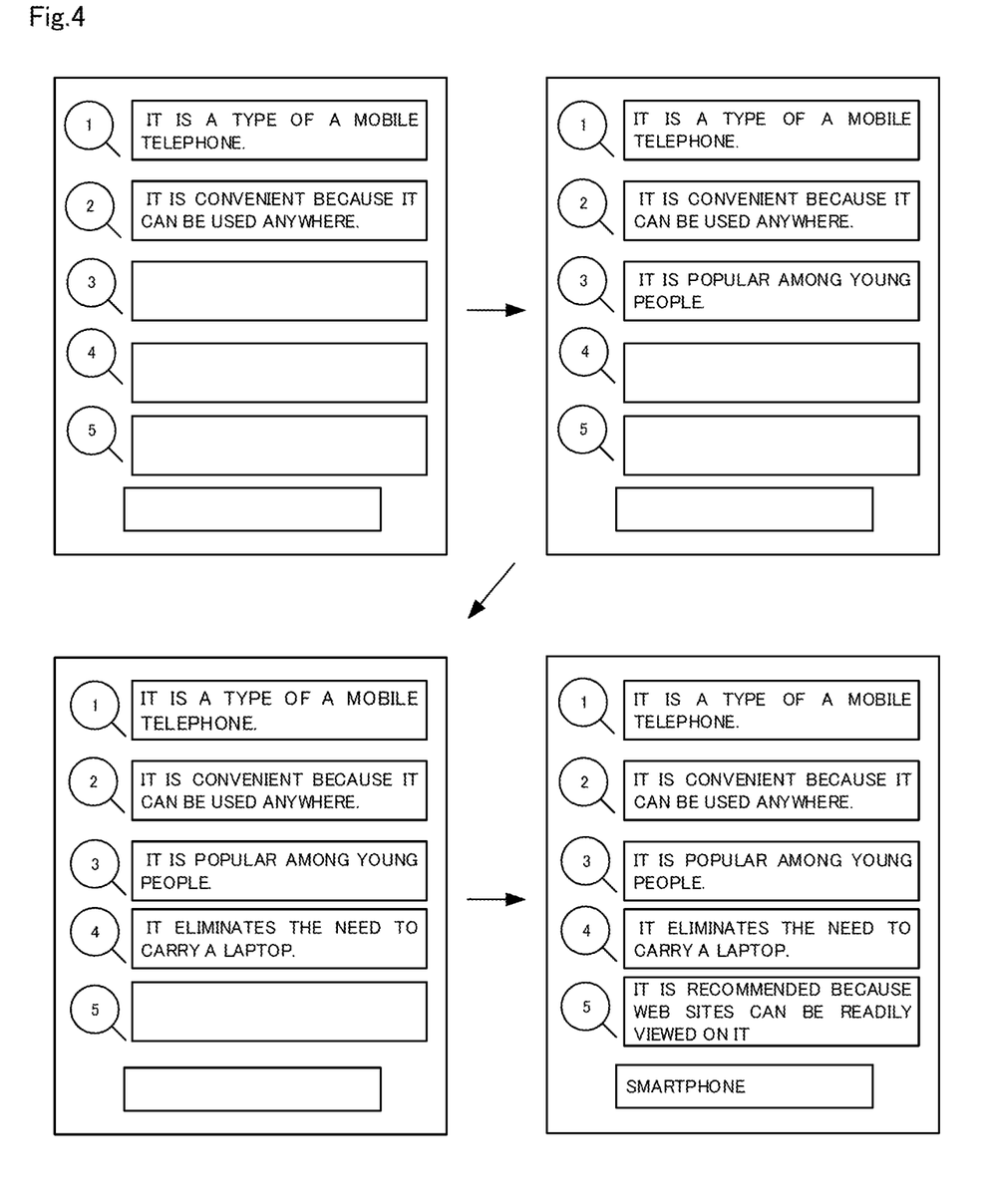
FIG. 4 shows an example of a quiz presented to a respondent in the embodiment of the present invention.
Figure 5:
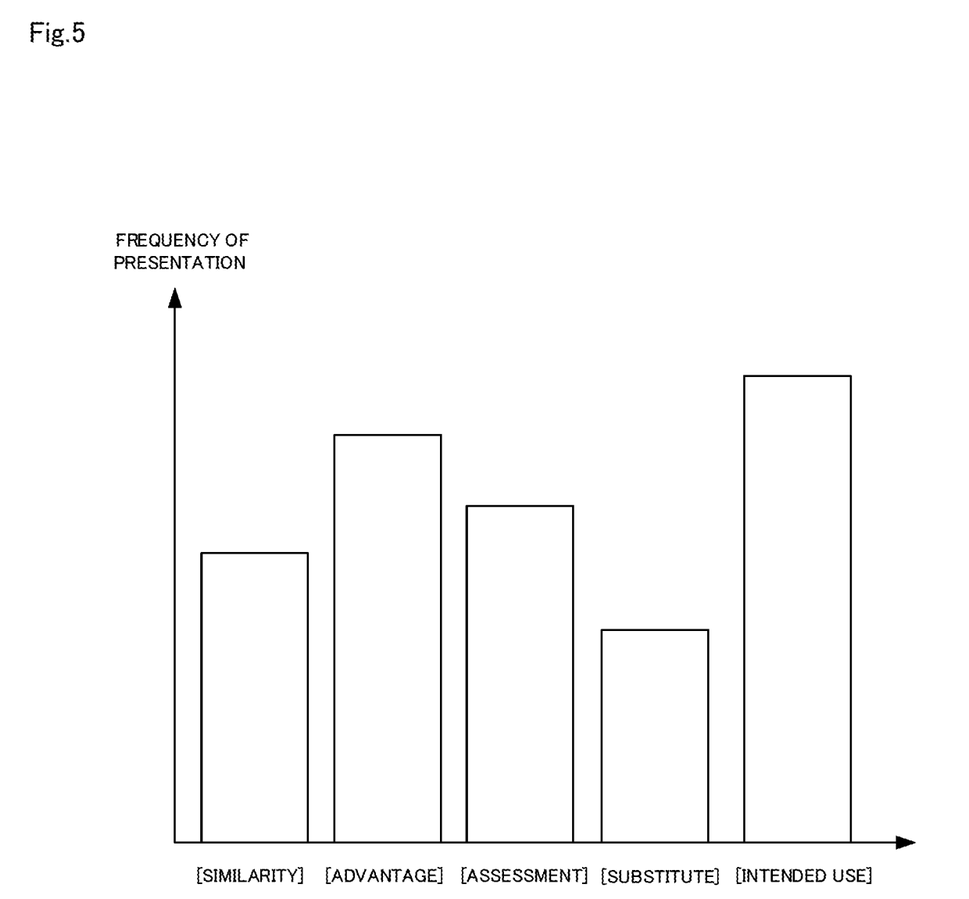
FIG. 5 shows an example of the result of statistical processing according to the embodiment of the present invention.

Next, a specific configuration of the data collection apparatus according to the present embodiment will be described using FIGS. 2 to 5. FIG. 2 is a block diagram showing the specific configuration of the data collection apparatus according to the embodiment of the present invention. FIG. 3 shows examples of templates used in the embodiment of the present invention. FIG. 4 shows an example of a quiz presented to the respondent in the embodiment of the present invention. FIG. 5 shows an example of the result of the statistical processing according to the embodiment of the present invention.

As shown in FIG. 2, in the present embodiment, the data collection apparatus 10 includes a communication unit 15 and a template storage unit 16 in addition to the template distribution unit 11, the quiz distribution unit 12, the data analysis unit 13, and the template updating unit 14.

The communication unit 15 is a communication interface connected to the network 30, and exchanges data with the terminal devices 20. The template distribution unit 11, the quiz distribution unit 12, and the data analysis unit 13 perform data communication with the terminal devices 20 via the communication unit 15.

A plurality of prepared templates are stored in the template storage unit 16. In the present embodiment, one template is composed of one sentence with a blank portion. Furthermore, as shown in FIG. 3, an attribute is set with respect to each of the stored templates. In the example of FIG. 3, the following attributes are shown: "similarity," "feature," "substitute", "intended use," "advantage," "buying motive," "assessment," "purpose," "function," "form," "weight," "user," and "scene of use." Note that the attributes shown in FIG. 3 are examples.

In the present embodiment, the template distribution unit 11 extracts templates targeted for distribution from the template storage unit 16, and distributes the extracted templates to the terminal device 20 of the player serving as the quiz provider. Note that the number of templates targeted for distribution is not limited to a particular number.

In the present embodiment, the template distribution unit 11 also distributes topics that compose quizzes, in addition to the templates, to the terminal device 20 of the player serving as the quiz provider. The number of topics to be distributed is not limited to a particular number. One or more topics may be distributed. Furthermore, when distributing a plurality of topics, the template distribution unit 11 can also set one or both of the selection order and the priority in accordance with which the quiz provider selects a topic from among the plurality of topics.

For example, when a plurality of topics and the templates shown in FIG. 3 have been distributed, the player serving as the quiz provider first decides on a topic from among the plurality of topics based on one or both of the selection order and the priority that have been set for the plurality of topics. Next, the player generates descriptions of the topic that has been decided on by inserting necessary words into the blank portions of the distributed templates. The number of descriptions to be generated may be designated by the data collection apparatus 10, or may be freely set by the player. In the latter case, the data collection apparatus 10 may designate a range of numbers that can be set by the player.

The player serving as the quiz provider also sets provision ranks in accordance with which the descriptions are presented. The player serving as the quiz provider then transmits the generated quiz from his/her terminal device 20 to the data collection apparatus 10. Note that a quiz contains a topic, descriptions of the topic, and the ranks of the descriptions.

Specifically, for example, when "smartphone" has been decided on as the topic, the following descriptions are generated. Below, the numeric values denote the ranks.

1. It is a type of a mobile telephone [similarity].
2. It is convenient because it can be used anywhere [advantage].
3. It is popular among young people [assessment].
4. It eliminates the need to carry a laptop [substitute].
5. It is recommended because web sites can be readily viewed on it [intended use].

In providing such a quiz composed of the topic and the descriptions, the descriptions are presented in sequence in accordance with the set ranks. The quiz is considered to be correctly solved when a word associated by the respondent during the presentation matches the topic. When the word associated by the respondent does not match the topic, the next description is presented. The present embodiment is not limited to this example. For example, the present embodiment may adopt a mode in which all of the descriptions are presented at once, and the respondent keeps inputting a word that he/she has associated until the quiz is correctly solved or until the number of times the word has been input reaches a set number.

When a quiz has been transmitted, the quiz distribution unit 12 receives the transmitted quiz. The quiz distribution unit 12 then distributes the quiz received from the terminal device 20 of the player serving as the quiz provider to the terminal device 20 of the player serving as the respondent. At the time of distribution, the quiz distribution unit 12 can change the provision ranks of descriptions with reference to the provision ranks set by the player serving as the quiz provider. Furthermore, at the time of distribution, the quiz distribution unit 12 can generate a single new quiz by integrating a plurality of quizzes transmitted by the terminal devices 20 of different quiz providers.

When the data collection apparatus 10 has distributed the quiz, the terminal device 20 of the player serving as the respondent provides the distributed quiz. Subsequently, the player serving as the respondent provides a response to the quiz. The terminal device 20 transmits the response to the data collection apparatus 10.

Specifically, as shown in FIG. 4, the terminal device 20 that has received the quiz presents the descriptions contained in the quiz in sequence in accordance with the set ranks. The player serving as the respondent finds an answer that he/she has associated with the descriptions, and inputs the associated answer.

When the input answer and the topic of the quiz do not match, the terminal device 20 presents the next description. On the other hand, when the input answer and the topic of the quiz match, the terminal device 20 presents content that is indicative of the match, and finishes providing the quiz. The quiz is such that the sooner the answer provided by the respondent matches the topic, the higher the score awarded to the respondent. Therefore, the quiz is intended to increase the motivations of the players.

Even when the input answer and the topic of the quiz do not match, the terminal device 20 presents all of the descriptions, and finishes providing the quiz upon reaching a set time limit.

Once the terminal device 20 of the player serving as the respondent has finished providing the quiz, it transmits the following as a response to the data collection apparatus 10: the description that was presented when the answer and the topic matched, the answer(s) that did not match the topic, and the description(s) that were presented when the answer(s) and the topic did not match. The terminal device 20 of the player serving as the respondent can also transmit the answer(s) and a time period(s) from the start of presentation of the quiz to the inputting of the answer(s) to the data collection apparatus 10.

When the terminal device 20 of the player serving as the respondent has transmitted the response, the data analysis unit 13 receives the transmitted response, and applies the statistical processing to the received response. In the statistical processing according to the present embodiment, the data analysis unit 13 first calculates reliability degrees that indicate, in the form of numeric values, how reliably the descriptions contained in the quiz describe the topic based on the obtained response. The data analysis unit 13 also outputs the calculated reliability degrees to the outside as needed.

For example, for each description, the data analysis unit 13 first specifies the number of times the answer and the topic matched from the responses from different players. Subsequently, the data analysis unit 13 performs normalization so that each specified number is "1" at most, and uses each normalized number as a reliability degree.

The data analysis unit 13 can also specify a description that yielded no match between the answer and the topic from the responses from different players. When a topic of another quiz matched the incorrect answer, the data analysis unit 13 instructs the quiz distribution unit 12 to include the specified description into another quiz. This is because a description that is not appropriate for a certain topic may be appropriate for another topic.

Furthermore, the data analysis unit 13 specifies the attributes of the descriptions presented to the player serving as the respondent. Specifically, for example, the data analysis unit 13 classifies the descriptions that were actually presented by attribute, specifies the number of times the descriptions were presented on a per-attribute basis (regardless of whether the quiz was correctly solved), and generates a histogram shown in FIG. 5. The histogram shown in FIG. 5 clarifies a correspondence between the attributes of the descriptions and the frequencies of presentation during the provision of the quiz. The data analysis unit 13 may also specify the number of times the quiz was correctly solved, the number of times the descriptions were contained in the quiz on a per-attribute basis (regardless of whether the quiz was provided), the number of times the descriptions were contained in the quiz that was provided on a per-attribute basis, and so forth.

In the present embodiment, the template updating unit 14 updates the templates targeted for distribution by executing at least one or all of deletion, addition, alteration, and rank reversing with respect to the templates targeted for distribution based on the attributes of the descriptions specified by the data analysis unit 13. For example, assume a case in which attribute A is associated with extremely low reliability degrees and attribute B is associated with extremely high reliability degrees according to the histogram shown in FIG. 5. In this case, the template updating unit 14 deletes some of the templates with attribute B from the templates targeted for distribution, and newly adds templates with attribute A as templates targeted for distribution.

In the present embodiment, no restriction is intended regarding the terminal devices 20 that are used by the players to generate a quiz and to respond to a quiz. The terminal devices 20 may be general-purpose personal computers (PCs), smartphones, tablet terminals, or any other devices.

[Apparatus Operations]

Figure 6:
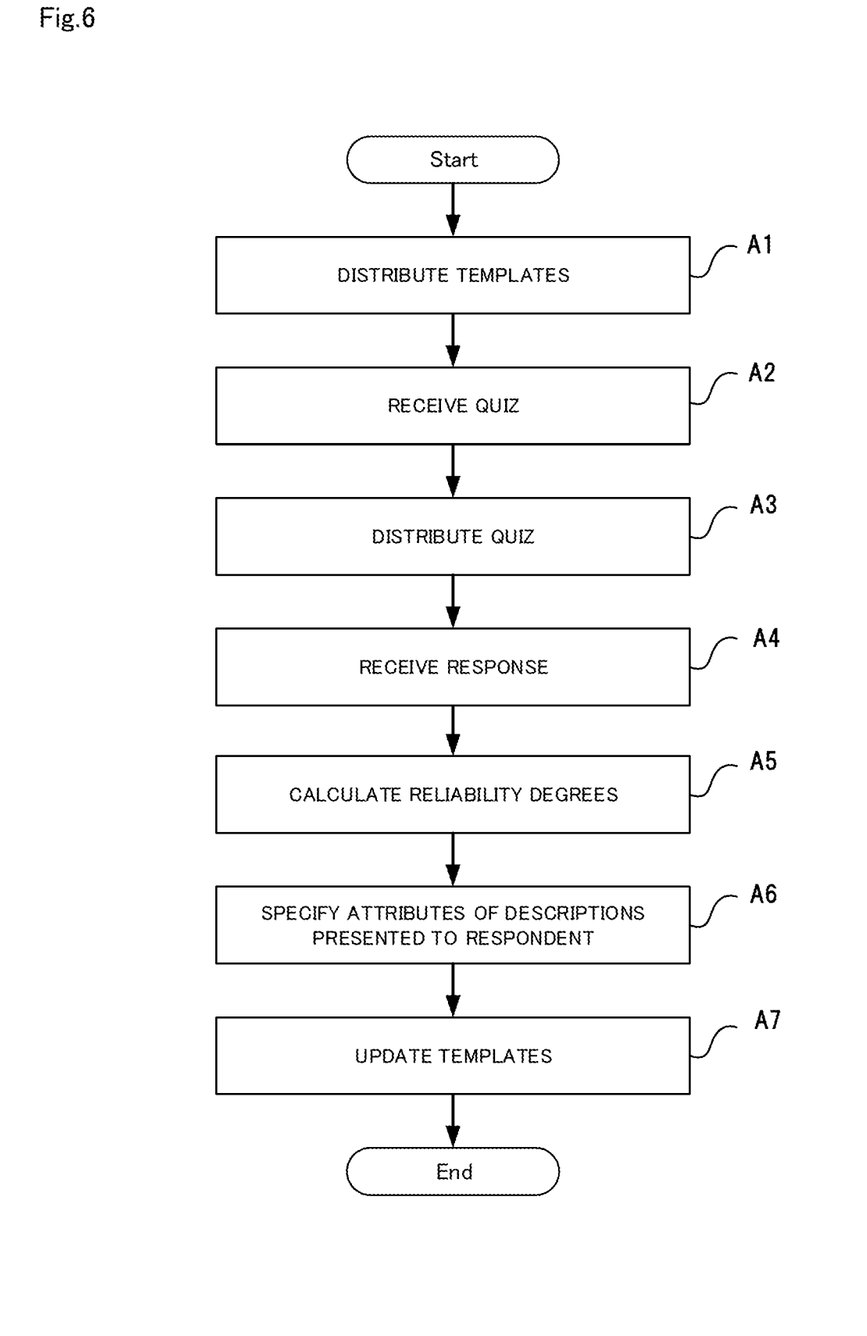
FIG. 6 is a flowchart showing the operations of the data collection apparatus according to the embodiment of the present invention.

Using FIG. 6, the following describes the operations of the data collection apparatus 10 according to the embodiment of the present invention. FIG. 6 is a flowchart showing the operations of the data collection apparatus according to the embodiment of the present invention. In the following description, FIGS. 1 to 5 will be referred to as appropriate. In the present embodiment, the data collection method is implemented by causing the data collection apparatus 10 to operate. Therefore, the following description of the operations of the data collection apparatus 10 applies to the data collection method according to the present embodiment.

As shown in FIG. 6, first, the template distribution unit 11 specifies the terminal device 20 of the player serving as the quiz provider, and distributes templates targeted for distribution to the specified terminal device 20 (step A1). Specifically, the template distribution unit 11 first extracts the templates targeted for distribution from a large number of templates stored in the template storage unit 16, and then distributes the extracted templates to the specified terminal device 20. The templates targeted for distribution are updated in later-described step A7.

After step A1 has been executed, the player serving as the quiz provider generates a quiz, and when the generated quiz has been transmitted, the quiz distribution unit 12 receives the transmitted quiz (step A2). Subsequently, the quiz distribution unit 12 specifies the terminal device 20 of the player 20 serving as the respondent, and distributes the quiz to the specified terminal device 20 (step A3).

After step A3 has been executed, the player serving as the respondent inputs a response on his/her terminal device 20 as shown in FIG. 4, and when this terminal device 20 has transmitted the response, the data analysis unit 13 receives the transmitted response (step A4). Then, the data analysis unit 13 calculates reliability degrees based on the obtained response (step A5).

Next, based on the response received in step A4, the data analysis unit 13 specifies the attributes of descriptions that were presented to the respondent (step A6). Specifically, the data analysis unit 13 classifies the descriptions that were actually presented by attribute, specifies the number of times the descriptions were presented on a per-attribute basis, and generates the histogram shown in FIG. 5.

Next, based on the attributes of the descriptions specified in step A6, the template updating unit 14 updates the templates targeted for distribution (step A7). Once step A7 has been executed, processing of the data collection apparatus 10 ends. When step A1 is executed next, the updated templates are used in the execution of step A1.

Advantageous Effects of Embodiment

As described above, the present embodiment analyzes the attributes and the reliability degrees of descriptions to control bias in the attributes of collected data. The present embodiment enables collection of data with attributes that are desired by a data collector.

Modification Example

A modification example of the present embodiment will now be described. In the modification example, the data analysis unit 13 can present the generated histogram to an administrator of the data collection apparatus 10 by displaying the generated histogram on a screen. In this case, the administrator can examine what the attributes of additionally required data are based on the histogram, and issue an instruction for adjusting the attributes of templates to the data collection apparatus 10. When such an instruction has been issued, the template updating unit 14 executes deletion, addition, alteration, rank reversing, and the like with respect to templates targeted for distribution in accordance with the instruction. Therefore, the modification example can also achieve the aforementioned advantageous effects of the embodiment.

[Program]

It is sufficient for a program according to the embodiment of the present invention to cause a computer to execute steps A1 to A7 shown in FIG. 6. The data collection apparatus 10 and the data collection method according to the present embodiment can be realized by installing this program in the computer and executing the installed program. In this case, a central processing unit (CPU) of the computer functions as the template distribution unit 11, the quiz distribution unit 12, the data analysis unit 13, and the template updating unit 14, and executes processing.

Figure 7:
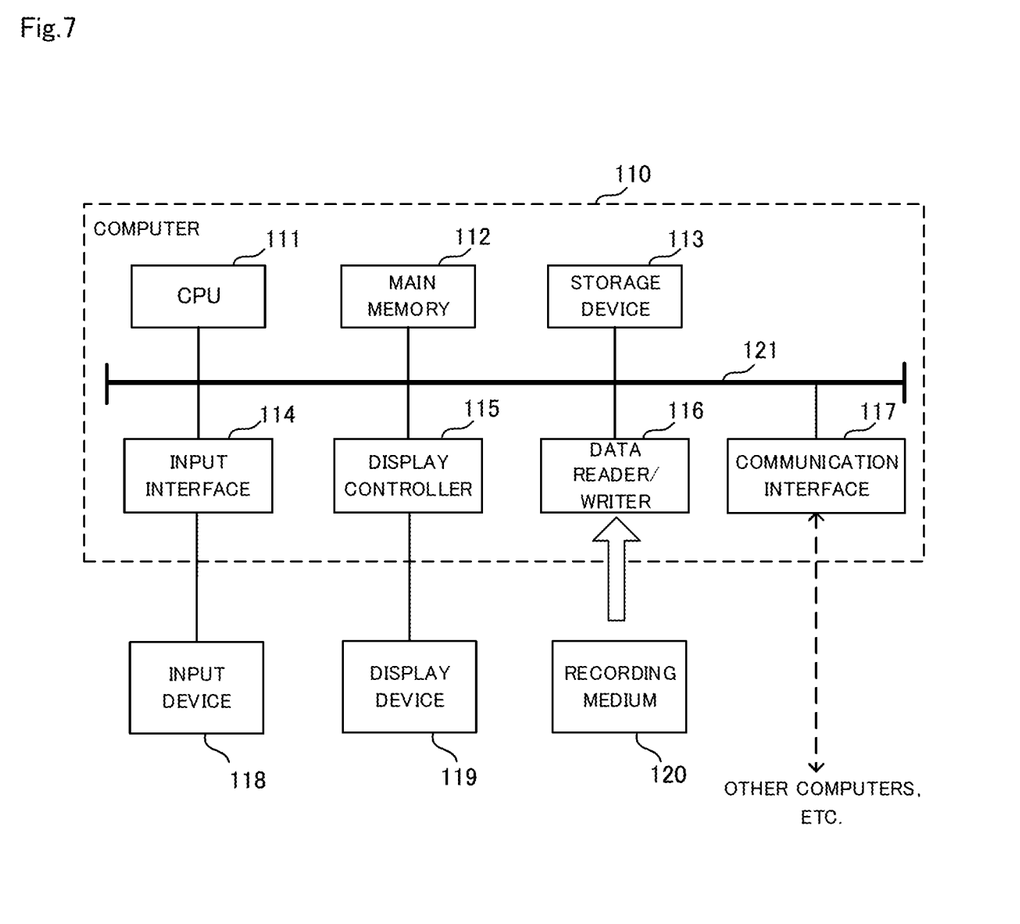
FIG. 7 is a block diagram showing an example of a computer that realizes the data collection apparatus according to the embodiment of the present invention.

Using FIG. 7, the following describes the computer that realizes the data collection apparatus 10 by executing the program according to the present embodiment. FIG. 7 is a block diagram showing an example of the computer that realizes the data collection apparatus according to the embodiment of the present invention.

As shown in FIG. 7, a computer 110 includes a CPU 111, a main memory 112, a storage device 113, an input interface 114, a display controller 115, a data reader/writer 116, and a communication interface 117. These components are connected in such a manner that they can perform data communication with one another via a bus 121.

The CPU 111 performs various types of calculation by deploying the program (code) according to the present embodiment stored in the storage device 113 to the main memory 112, and executing the deployed program in a predetermined order. The main memory 112 is typically a volatile storage device, such as a dynamic random-access memory (DRAM). The program according to the present embodiment is provided while being stored in a computer-readable recording medium 120. The program according to the present embodiment may be distributed over the Internet connected via the communication interface 117.

Specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120. The data reader/writer 116 reads out the program from the recording medium 120, and writes the result of processing of the computer 110 to the recording medium 120. The communication interface 117 mediates data transmission between the CPU 111 and other computers.

Specific examples of the recording medium 120 include: a general-purpose semiconductor storage device, such as CompactFlash® (CF) and Secure Digital (SD); a magnetic storage medium, such as a flexible disk; and an optical storage medium, such as a compact disc read-only memory (CD-ROM).

INDUSTRIAL APPLICABILITY

As described above, the present invention can control the attributes of data to be collected when data collection is performed via a game on a network. The present invention is useful in a variety of fields that require data collection on a network.

REFERENCE SIGNS LIST 10 data collection apparatus
11 template distribution unit
12 quiz distribution unit
13 data analysis unit
14 template updating unit
15 communication unit
16 template storage unit
20 terminal device
30 network
110 computer
111 CPU
112 main memory
113 storage device
114 input interface
115 display controller
116 data reader/writer
117 communication interface
118 input device
119 display device
120 recording medium
121 bus

The invention claimed is:

1. A data collection apparatus, comprising:
at least one memory configured to store one or more instructions; and
at least one processor configured to execute the stored instructions to:
distribute, to a terminal device of a quiz provider who provides a quiz composed of a plurality of descriptions of a topic, templates that are used in generation of the quiz and that each serve as a basis for a different one of the plurality of descriptions;
obtain the quiz that has been generated by the quiz provider using the templates from the terminal device associated with the quiz provider;
distribute the obtained quiz to a terminal device associated with a respondent;
obtain a response from the terminal device associated with the respondent;
apply statistical processing to the obtained response;
update the distributed templates based on a result of the applied statistical processing;
provide the quiz by presenting the plurality of descriptions, wherein the quiz is considered to be correctly solved when a word associated with the respondent during the presentation matches the topic; and
in response to a determination of the quiz as being incorrectly solved based on a word associated with the respondent matching a different topic, distribute the word as a description of a problem of the different topic.

2. The data collection apparatus according to claim 1, wherein
attributes are set with respect to the templates in advance, and
in the statistical processing, reliability degrees are calculated that indicate, in the form of numeric values, how reliably the descriptions describe the topic based on the obtained response.

3. The data collection apparatus according to claim 2, wherein
the templates targeted for distribution to the quiz provider from among a plurality of prepared templates are distributed,
the attributes of the descriptions presented to the respondent are further specified, and
based on the attributes of the specified descriptions, at least one of deletion, addition, alteration, and rank reversing with respect to the templates targeted for distribution are executed.

4. The data collection apparatus according to claim 2, wherein
the templates targeted for distribution to the quiz provider from among a plurality of prepared templates are distributed,
the attributes of the descriptions presented to the respondent are further specified, and
in accordance with an external instruction, at least one of deletion, addition, alteration, and rank reversing with respect to the templates targeted for distribution are executed.

5. A data collection method using a computer, comprising:
distributing, to a terminal device associated with a quiz provider who provides a quiz composed of a plurality of descriptions of a topic, templates that are used in generation of the quiz and that each serve as a basis for a different one of the plurality of descriptions;
obtaining the quiz that has been generated by the quiz provider using the templates from the terminal device associated with the quiz provider;
distributing the obtained quiz to a terminal device associated with a respondent;
obtaining a response from the terminal device associated with the respondent;
applying statistical processing to the obtained response;
based on a result of the applied statistical processing, updating the templates targeted for distribution;
providing the quiz by presenting the plurality of descriptions, wherein the quiz is considered to be correctly solved when a word associated with the respondent during the presentation matches the topic; and
in response to a determination of the quiz as being incorrectly solved based on a word associated with the respondent matching a different topic, distributing the word as a description of a problem of the different topic.

6. The data collection method according to claim 5, wherein
attributes are set with respect to the templates in advance, and
in the statistical processing, reliability degrees that indicate, in the form of numeric values, how reliably the descriptions describe the topic based on the obtained response are calculated.

7. The data collection method according to claim 6, wherein
the templates targeted for distribution to the quiz provider from among a plurality of prepared templates are distributed,
the attributes of the descriptions presented to the respondent are further specified, and based on the attributes of the specified descriptions, at least one of deletion, addition, alteration, and rank reversing with respect to the templates targeted for distribution are executed.

8. The data collection method according to claim 6, wherein
the templates targeted for distribution to the quiz provider from among a plurality of prepared templates are distributed,
the attributes of the descriptions presented to the respondent are further specifies, and
in accordance with an external instruction at least one of deletion, addition, alteration, and rank reversing with respect to the templates targeted for distribution are executed.

9. A non-transitory computer-readable recording medium having recorded therein a program including an instruction that causes a computer including a processor to execute:
distributing, by the processor, to a terminal device associated with a quiz provider who provides a quiz composed of a plurality of descriptions of a topic, templates that are used in generation of the quiz and that each serve as a basis for a different one of the plurality of descriptions;
obtaining, by the processor, the quiz that has been generated by the quiz provider using the templates from the terminal device associated with the quiz provider;
distributing, by the processor, the obtained quiz to a terminal device associated with a respondent;
obtaining a response from the terminal device associated with the respondent;
applying, by the processor, statistical processing to the obtained response;
based on a result of the applied statistical processing, updating, by the processor, the templates targeted for distribution;
providing, by the processor, the quiz by presenting the plurality of descriptions, wherein the quiz is considered to be correctly solved when a word associated with the respondent during the presentation matches the topic; and
in response to a determination of the quiz as being incorrectly solved based on a word associated with the respondent matching a different topic, distributing, by the processor, the word as a description of a problem of the different topic.

10. The non-transitory computer-readable recording medium according to claim 9, wherein
attributes are set with respect to the templates in advance, and
in the statistical processing, reliability degrees that indicate, in the form of numeric values, how reliably the descriptions describe the topic based on the obtained response are calculated by the processor.

11. The non-transitory computer-readable recording medium according to claim 10, wherein
the templates targeted for distribution to the quiz provider from among a plurality of prepared templates are distributed by the processor,
the attributes of the descriptions presented to the respondent are further specified by the processor, and
based on the attributes of the specified descriptions, at least one of deletion, addition, alteration, and rank reversing with respect to the templates targeted for distribution are executed by the processor.

12. The non-transitory computer-readable recording medium according to claim 10, wherein
the templates targeted for distribution to the quiz provider from among a plurality of prepared templates, are distributed by the processor,
the attributes of the descriptions presented to the respondent are further specified by the processor, and
in accordance with an external instruction, at least one of deletion, addition, alteration, and rank reversing with respect to the templates targeted for distribution are executed by the processor.

* * * * *